United States Patent
Farwell

[11] Patent Number: 5,180,264
[45] Date of Patent: Jan. 19, 1993

[54] ANCHOR BOLT

[75] Inventor: Robert M. Farwell, Stourbridge, England

[73] Assignee: Emhart, Inc., Newark, Del.

[21] Appl. No.: 817,176

[22] Filed: Jan. 6, 1992

[30] Foreign Application Priority Data

Jan. 7, 1991 [GB] United Kingdom ............... 9100258
Dec. 19, 1991 [GB] United Kingdom ............... 9126976

[51] Int. Cl.[5] ................... F16B 13/04; F16B 13/06
[52] U.S. Cl. ................................. 411/32; 411/55; 411/60
[58] Field of Search ............ 411/32, 33, 34–38, 411/55, 60, 61, 397, 508–510

[56] References Cited

U.S. PATENT DOCUMENTS

| | | | |
|---|---|---|---|
| 2,147,357 | 2/1939 | Scholtes | 411/33 |
| 3,468,211 | 9/1969 | Suan | 411/397 |
| 4,147,458 | 4/1979 | Elders | 411/33 |
| 4,810,144 | 3/1989 | Martelli | 411/510 |

FOREIGN PATENT DOCUMENTS

| | | | |
|---|---|---|---|
| 79726 | 8/1955 | Denmark | 411/34 |
| 917999 | 9/1954 | Fed. Rep. of Germany | 411/34 |
| 472754 | 6/1952 | Italy | 411/33 |
| 137527 | 10/1952 | Sweden | 411/34 |

Primary Examiner—Neill R. Wilson
Attorney, Agent, or Firm—Spencer T. Smith

[57] ABSTRACT

An anchor bolt comprising a threaded stem and a head at one end of the stem; a tubular, hard rubber sleeve held on the stem by a retaining collar nut has a deeply-dished metal washer located on the stem between the head and the sleeve nut with its open end directed towards the sleeve. The dished washer preferably has axial grooves extending from its periphery towards the centre. When the bolt is set, the dished washer is distorted by compression to undercut the hole and the rubber sleeve cooperates with the stem and the walls of the hole to give a very high pull-out resistance.

2 Claims, 1 Drawing Sheet

ANCHOR BOLT

BACKGROUND OF THE INVENTION

The present invention relates to an anchor bolt of the kind known as a sleeve anchor and comprising a stem having a head at one end and the end portion of the stem remote from the head being threaded, a tubular sleeve placed over said stem being retained between the head and a threaded retaining member screwed onto the threaded end of the stem. The retaining member also serves to hold a component to be attached to the anchor bolt.

In use, the anchor bolt is inserted head first into a pre-prepared hole drilled in the concrete or masonry body to which articles are to be affixed. After assembly of the articles, the retaining member is then screwed further on to the thread so that the tubular sleeve is compressed between the head of the stem and the retaining member and the distortion of the tubular sleeve so caused serves to retain the anchor in the pre-prepared hole.

It is an object of the present invention to provide an improved sleeve anchor with increased holding power.

BRIEF DESCRIPTION OF THE INVENTION

According to the present invention, an anchor bolt is provided comprising a stem having a head at one end of the stem, at least the end portion of the stem remote from the head being threaded, a tubular sleeve placed over said stem being retained between the head and a threaded retaining member screwed onto the threaded end of the stem characterised in that the tubular sleeve is made of resilient material and a deeply-dished washer is located on the stem between the sleeve and the head and has its broad, open face directed towards the sleeve, so that the frusto-conical portion tapers inwardly towards the head of the stem.

The tubular sleeve 8 is made of a hard, resilient material such as a synthetic rubber of high Shore hardness or a synthetic plastics material of similar properties.

The dished washer is made of metal and is preferably provided with a plurality of radial slots extending from its outer periphery part way towards the centre of the washer.

The periphery of the dished washer may be smooth or it may be provided with teeth or other irregularities to facilitate penetration of concrete or masonry.

The threaded retaining member may be a collar nut and a packing washer may be provided between the collar nut and the tubular sleeve. The packing washer is preferably the same diameter as the sleeve.

Similarly, the head may also take the form of a nut screwed onto a threaded stem and, again, a packing washer may be provided between this head nut and the sleeve.

A packing washer may also be located at the open mouth side of the deeply-dished washer.

BRIEF DESCRIPTION OF THE DRAWINGS

In order that the invention can be better understood a preferred embodiment will now be described in greater detail by way of example with reference to the accompanying drawings in which.

DETAILED DESCRIPTION OF DRAWINGS AND PREFERRED EMBODIMENT

Figure 1:
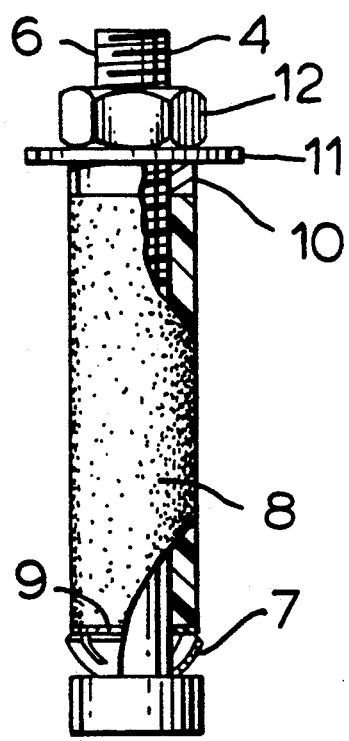
FIG. 1 is a schematic part-section of an anchor bolt according to the invention.
Figure 2:
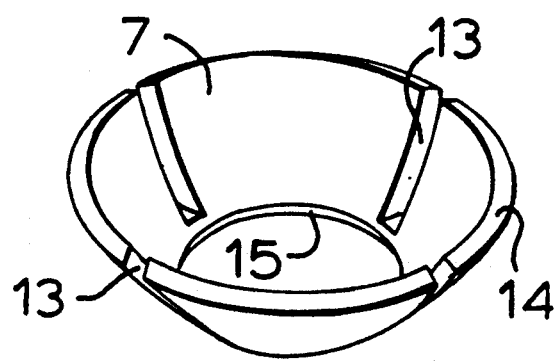
FIG. 2 is a perspective view on an enlarged scale of a dished washer included in the anchor bolt of FIG. 1.
Figure 3:
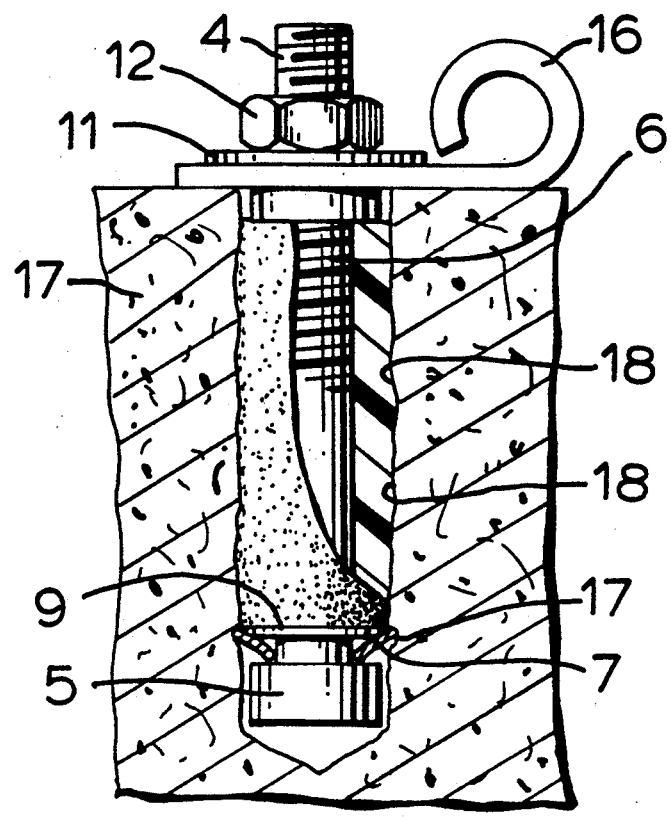
FIG. 3 is a part-section of the anchor bolt of FIG. 1 as set in a hole drilled into a block of masonry or concrete.

FIG. 1 illustrates an anchor bolt according to the present invention comprising a stem 4 having a head 5 and a threaded end 6. A deeply-dished metal washer 7 is located on stem 4 adjacent head 5 with its wider, open end facing away from the head. A tubular sleeve 8 of hard butyl rubber having the same diameter as head 5 is located on stem 4 and is assembled between two packing washers 9, 10 also having the same diameter as head 5. The assembly of deeply-dished washer 7, tubular sleeve 8 and packing washers 9, 10 is held against head 5 by a large retaining washer 11 and retaining nut 12. The deeply-dished washer 7 is provided with four radial slots 13, each extending from the wide periphery 14 of the dished washer 7 almost to the centre 15 of the dished washer.

In order to attach a component 16 to a mass of concrete 17, a hole is bored into the concrete using a drill slightly larger than the diameter of head 5 and sleeve 8 and the anchor is inserted into the hole so that component 16 is located next to the concrete mass. By tightening or rotating the retaining nut 12 on stem 4, the assembly is compressed and as the head of the stem moves towards the affixed component, the deeply-dished washer 7 is flattened thereby, the sharp periphery 14 acts as a cutting edge to engage and cut into the concrete at 17, thus effectively providing an undercut in the hole. In addition to the deformation of deeply-dished washer 7, the rubber sleeve is caused to be compressed so as to fill irregularities 18 in the wall of the hole and thus to effect a full contact with the wall of the hole which exerts considerable gripping load in the hole, as well as a firm grip on stem 4. The packing washer 9 serves to prevent any possibility of the material of the tubular sleeve 8 from being extruded into the deeply-dished washer 7.

The packing washer 10 serves to support any side loads that may be applied to the anchor bolt.

The anchor of the invention is thereby given a very high pull-out resistance, greatly in excess of that achieved by hitherto-known anchors.

I claim:

1. A sleeve anchor comprising
   a bolt including a head portion and a threaded shaft portion,
   a dished washer having an opening at the bottom for receiving said shaft portion and an enlarged opening at the top, said washer seated on said head portion with said bottom adjacent said head portion,
   an annular washer having a central opening for receiving said shaft portion and having an outer diameter selected so that said annular washer will engage said dished washer proximate said top opening,
   a tubular resilient sleeve located on said shaft portion engaging said annular washer, and
   nut means for forcefully urging said sleeve and annular washer against said dished washer to spread said dished washer outwardly into locking engagement with a hole in which said sleeve anchor is located.

2. A sleeve anchor according to claim 1, wherein said dished washer includes a plurality of radial slots extending from said top toward said bottom.

* * * * *